Patented Jan. 10, 1950

2,494,087

UNITED STATES PATENT OFFICE 2,494,087

PREPARATION OF CHLOROPRENE POLYMERS

George H. Daniels, Wilmington, Del., assignor to E. I. du Pont de Nemours & Company, Wilmington, Del., a corporation of Delaware No Drawing. Application March 23, 1948, Serial No. 16,630

3 Claims. (Cl. 260—92.3)

This invention relates to an improvement in the preparation of chloroprene polymers, and more particularly to a process for producing polychloroprene (polymerized 2-chloro-1,3-butadiene) of more uniform plasticity where the polymerization is carried out in the presence of mercaptans and in the presence of a small amount of carbonyl compounds which may be present in the chloroprene and which have been found heretofore to alter the effectiveness of the mercaptans during the polymerization step.

Chloroprene, when made by the usual method such as by polymerizing acetylene to form monovinyl acetylene which is then hydrochlorinated, contains even after ordinary purification small and variable amounts of carbonyl compounds, principally acetaldehyde and methyl vinyl ketone. Although these impurities cause little or no trouble when the chloroprene is polymerized by many of the common methods, they are extremely troublesome when the chloroprene is polymerized in alkaline emulsion by methods involving alkyl mercaptans as modifying agents. These carbonyl impurities apparently interfere with the modifying action of the mercaptans and, as a result, decrease the plasticity of the resulting polymers. Thus, as the amount of the carbonyl impurities in the chloroprene varies, the plasticity of the polymers varies to an extent much greater than is allowable in a rubberlike material in most industrial uses. Although the effect of these carbonyl compounds may be overcome by increasing the amount of mercaptan employed, this is an impractical solution to the problem and one that is wasteful of valuable material. It is impossible to predetermine the correct amount of mercaptan required to produce the desired plasticity in a given lot of chloroprene. This is because no analytical methods are available for separately determining small amounts of acetaldehyde and methyl vinyl ketone in the presence of each other, and, since the latter has a much greater effect than the former, their determination together as total carbonyl does not give a figure which bears any definite relation to mercaptan requirements. The alternative of further purifying the chloroprene by chemical treatment or by elaborate distillation has the disadvantages of adding another step to the process and of destroying part of the chloroprene.

It is therefore an object of the present invention to obtain polymers of uniform plasticity from chloroprene containing varying amounts of carbonyl compounds when the polymerization is carried out in alkaline aqueous emulsion and in the presence of alkyl mercaptans as modifiers. A further object is to control the plasticity of the polychloroprene when it is made from different lots of chloroprene monomer which may contain varying amounts of carbonyl impurities. A further object also is to improve the modifying efficiency of a given mercaptan modifier concentration by protecting the mercaptan from being rendered at least in part ineffective by carbonyl impurities.

Polymerization of halogen substituted butadiene hydrocarbons in alkaline aqueous emulsions and in the presence of mercaptans yields polychloroprene that varies too widely in plasticity values to be of practical value. This wide variation in plasticity characteristics has been caused by uncontrolled variations in carbonyl impurities in the halogen substituted butadienes which are not ordinarily present in butadiene hydrocarbons.

I have found that polychloroprene of uniform plasticity can be obtained by polymerizing chloroprene containing carbonyl compound impurities in the presence of alkyl mercaptans and in an alkaline aqueous emulsion where the polymerization is carried out in the presence of from 0.05% to 0.5%, calculated on the weight of the chloroprene, of a reducing agent selected from the group consisting of water soluble sulfides, hydrosulfites, sulfites, hydroxylamine and hydrazine.

One embodiment of the present invention is illustrated by the following group of comparative examples in which the reducing agent is sodium sulfite, which is formed by the neutralization of the added sodium bisulfite with an excess of alkali. Forty-four (44) parts by weight of chloroprene (taken from various lots and containing 0.01% to 0.2% of carbonyl bodies calculated as acetaldehyde) and the amounts of dodecyl mercaptan indicated below are emulsified in 51 parts of an aqueous solution containing 1.3 parts of the sodium salt of a disproportionated wood rosin known commercially as Hercules "Dresinate" 731, 0.13 part of solid sodium hydroxide, 0.26 part of the sodium salt of a condensation product of formaldehyde and naphthalene sulfonic acid, and the indicated amount of sodium bisulfite. This produces an emulsion having a pH value of 11.5–12.5, indicating that all the bisulfite is in the form of the sulfite. The chloroprene is then polymerized by adjusting the temperature of the emulsion to 40° C. and adding continuously, at a rate which allows control of the temperature at 40° C. by external cooling, a catalyst solution which contains 0.25% potassium persulfate and 0.0125% sodium salt of anthraquinone-beta-sulfonic acid. The polymerization is short-stopped when the specific gravity of the emulsion reaches 1.053 at 40° C., which represents a 70% conversion of monomer to polymer, by the addition of 0.6 part of an emulsion containing 1.0% each of para-tertiary butyl catechol and phenothiazine. After removal of residual monomer by distillation, the emulsion is acidified by 10% acetic acid to a pH of 5.6, and the polymer removed by freeze coagulation in the form of a thin film. After washing and drying, a plastic product is obtained whose Williams plasticity number depends upon the parts of mercaptan employed. For a given mercaptan concentration (provided that bisulfite is used) products are obtained having Williams plasticity numbers which are duplicates within the limits of error of the measurement. Similarly, a given change in mercaptan concentration is reflected by a definite change in Williams plasticity number. In the absence of the reducing agent, the plasticity number of the products obtained, using a constant mercaptan concentration, may vary widely when using different samples of chloroprene, and a given change in mercaptan concentration will be reflected by an indefinite change in plasticity number. These effects may be seen in Table 1, for which one lot of chloroprene was used in Examples 1 and 2, a second in Examples 3 and 4, and a third in Examples 5 and 6. In each case the per cent of mercaptan and of reducing agent is based on the weight of the chloroprene.

*Table 1*

| Example No. | Mercaptan Concentration | Sodium Bisulfite | Williams Plasticity Number |
| --- | --- | --- | --- |
| | Per cent | Per cent | |
| 1 | 0.37 | | 118 |
| 2 | 0.37 | 0.10 | 79 |
| 3 | 0.37 | | 140 |
| 4 | 0.37 | 0.10 | 81 |
| 5 | 0.28 | | 155 |
| 6 | 0.28 | 0.29 | 99 |

The effectiveness of the other members of this group of reducing agents is shown in Table 2, the same lot of chloroprene being used throughout. In each of these examples, 0.28% of dodecyl mercaptan, based on the weight of the chloroprene, was employed.

*Table 2*

| Example No. | Reducing Agent (Mols equivalent to 0.30% Sodium Bisulfite) | Williams Plasticity Number |
| --- | --- | --- |
| 7 | Sodium Bisulfite | 104 |
| 8 | do | 105 |
| 9 | do | 102 |
| 10 | Sodium Sulfite | 100 |
| 11 | Sodium Sulfide | 98 |
| 12 | Hydrazine | 97 |
| 13 | Sodium Hydrosulfite | 116 |
| 14 | Hydroxylamine | 119 |
| 15 | do | 117 |
| 16 | None | 150 |

The effectiveness of these reducing agents increases with increasing concentration as shown by the decrease in the Williams plasticity number. However, the percentage decrease in the plasticity number is greatest for the first increment of reducing agent added and the further percentage decrease declines with further increments of the reducing agent. The concentration of the reducing agent, therefore, is not critical, so that an excess does no harm but guarantees protection of the valuable mercaptan against widely fluctuating carbonyl concentrations. This is shown in Table 3.

*Table 3*

| Example No. | Dodecyl Mercaptan | Sodium Bisulfite | Williams Plasticity Number |
| --- | --- | --- | --- |
| | Percent | | |
| 17 | 0.37 | | 118 |
| 18 | 0.37 | 0.10 | 79 |
| 19 | 0.37 | 0.50 | 68 |
| 20 | 0.37 | | 140 |
| 21 | 0.37 | 0.05 | 107 |
| 22 | 0.37 | 0.10 | 81 |

These agents are effective in protecting the modifying action of mercaptans in alkaline systems employing emulsifying agents other than the sodium salt of a disproportionated wood rosin. Thus, the potassium or ammonium salts may be used or any of the alkali salts of the higher fatty acids or rosin acids. Likewise, the pH of the emulsion may be varied over the range of 8.5 to 12.5. The reducing agent which is the mercaptan protector may be added either before, during or after carrying out the emulsification step or it may be added as an aqueous solution continuously or in a multiple number of aliquots during the polymerization.

The effective reducing agents are termed mercaptan protectors because they restore to the mercaptan, in the presence of carbonyl compounds, the modifying efficiency it displays for chloroprene polymer made from highly purified chloroprene which has been freed of carbonyl compounds. In the manufacture of chloroprene, small but variable amounts of acetaldehyde and methyl vinyl ketone are produced which are difficult to remove. These compounds have a pronounced effect on the efficiency of modification of chloroprene polymers. Thus, the addition of 0.10% of acetaldehyde to a sample of purified chloroprene decreased the efficiency of the mercaptan as a modifier so that the plasticity number was raised from 84 to 115, in one case, and the addition of 0.20% raised the plasticity number from 103 to 161 in another case. While the exact manner in which these agents operate to protect the efficiency of the mercaptans is not definitely understood, it is significant that in each case the protective agent is a reducing agent, although it appears that in view of the very small amount employed the reaction may not be strictly that of a reducing agent.

Methyl vinyl ketone is even more destructive of the modifying efficiency of the mercaptan than is acetaldehyde. The addition of 0.10% of methyl vinyl ketone to a sample of chloroprene already containing an unknown percentage of carbonyl compounds raised the plasticity number from 151 to 347. However, the addition of 0.44% of sodium bisulfite in addition to the 0.10% methyl vinyl ketone nullified the effect both of the added ketone and of the unknown carbonyl compounds present in the original chloroprene so that the plasticity number was reduced to 102. The mercaptan concentration employed in both cases was 0.28 calculated on the chloroprene.

As mercaptan protectors in the present invention we may use hydroxylamine, hydrazine and any water-soluble sulfite, hydrosulfite and sulfite such as ammonium sulfide, lithium sulfide, potassium sulfite, and potassium hydrosulfite, as well as the sodium salts used in the examples. In other words, the only requirement, so far as the salts are concerned, is that an effective concentration of sulfite, hydrosulfite or sulfide ions be present in the aqueous phase of the polymerizing emulsion. The agent need not be added as such but may be formed in the aqueous solution by adding a compound such as hydrogen sulfide, sodium bisulfite and hydroxylamine hydrochloride which will react with the excess of alkali present to form the desired agent.

These agents are effective with amounts of carbonyl compounds as small as 0.01% of the chloroprene, below which amount the carbonyl compounds have little practical effect. The agents are also effective with amounts up to 0.2% or more, although such large concentrations of carbonyl compounds are not ordinarily present in chloroprene made by the usual processes. Obviously, smaller amounts of carbonyl compounds require smaller amounts of the reducing agents, but there is no objection to adding more than the minimum amount required.

The process of the invention may be used with any aliphatic mercaptans, for example methyl, butyl, hexyl, octyl, cetyl and octadecyl mercaptans. These may be primary, secondary or tertiary, the chains being either straight or branched. n-Dodecyl mercaptan is preferred. Ordinarily the amount of mercaptan employed is 0.1% to 4.0% of the weight of the chloroprene.

The present invention may be employed in the polymerization of chloroprene either in the presence or absence of polymerization catalysts, although ordinarily the polymerization is preferably carried out in the presence of a polymerization catalyst, which, for example, may be a peroxide or persalt or complex cyanide such as disclosed and claimed in U. S. Patent 2,417,034. Auxiliary catalysts such as the anthraquinone sulfonates of U. S. Patent 2,426,854 may also be used. The mercaptan protectors themselves, however, do not significantly increase the speed of polymerization; the sulfides decrease it definitely, but not seriously.

The present invention is applicable to any type of polymerization of chloroprene containing carbonyl compounds in alkaline emulsion (pH 8.5 to 12.5) in the presence of alkyl mercaptans. The invention contemplates the polymerization of chloroprene in the presence of the mercaptan protectors, either in the polymerization of chloroprene itself or in the polymerization of chloroprene with mixtures of other polymerizable materials where the chloroprene is the principal polymerizing material and in which the effectiveness of the mercaptans is retarded by the presence of the carbonyl compound impurities. The polymerization may be short-stopped at a definite point, as in the above examples, or may be allowed to go to completion. The polymer may be isolated and worked up by milling or may be applied directly as a latex in various industrial processes.

I claim:

1. An improvement in the process for preparing polychloroprene by emulsion polymerization of chloroprene which contains from 0.01% to 0.2% of carbonyl compounds as impurities and wherein the polymerization is carried out in the presence of an alkyl mercaptan, which comprises carrying out the polymerization of the chloroprene in an aqueous alkaline emulsion having a pH of from 8.5 to 12.5 containing from 0.05% to 0.5%, based on the weight of the chloroprene, of a reducing agent selected from the group consisting of hydroxylamine, hydrazine, water-soluble sulfides, water-soluble hydrosulfites and water-soluble normal sulfites.

2. An improvement in the process for preparing polychloroprene by emulsion polymerization of chloroprene which contains from 0.01% to 0.2% of carbonyl compounds as impurities and wherein the polymerization is carried out in the presence of from 0.1% to 4.0% of an alkyl mercaptan, which comprises carrying out the polymerization of the chloroprene in an aqueous alkaline emulsion having a pH of from 8.5 to 12.5 containing from 0.05% to 0.5% of sodium sulfite, based on the weight of the chloroprene.

3. An improvement in the process for preparing polychloroprene by emulsion polymerization of chloroprene which contains from 0.01% to 0.2% of carbonyl compounds as impurities and wherein the polymerization is carried out in the presence of from 0.1% to 4.0% of n-dodecyl mercaptan, which comprises carrying out the polymerization of the chloroprene in an aqueous alkaline emulsion having a pH of from 8.5 to 12.5 containing from 0.05% to 0.5% of sodium sulfite, based on the weight of the chloroprene.

GEORGE H. DANIELS.

REFERENCES CITED

The following references are of record in the file of this patent:

UNITED STATES PATENTS

| Number | Name | Date |
| --- | --- | --- |
| 2,227,517 | Starkweather et al. | Jan. 7, 1941 |
| 2,371,719 | Starkweather | Mar. 20, 1945 |

OTHER REFERENCES

Lucas, "Organic Chemistry," American Book Co. (1935), (pages 245–246).